United States Patent [19]

Ashiba

[11] Patent Number: 5,205,385
[45] Date of Patent: Apr. 27, 1993

[54] ADJUSTABLE DAMPING FORCE HYDRAULIC SHOCK ABSORBER

[75] Inventor: Masahiro Ashiba, Kanagawa, Japan

[73] Assignee: Tokico, Ltd., Kanagawa, Japan

[21] Appl. No.: 732,122

[22] Filed: Jul. 18, 1991

[30] Foreign Application Priority Data

Jul. 20, 1990 [JP] Japan ................... 2-192264

[51] Int. Cl.$^5$ .............................. F16F 9/34
[52] U.S. Cl. ..................... 188/299; 188/319
[58] Field of Search .................. 188/299, 319

[56] References Cited

U.S. PATENT DOCUMENTS

| 4,638,896 | 1/1987 | Poyser | 188/299 |
| 4,696,379 | 9/1987 | Yamamoto et al. | 188/319 X |
| 4,723,640 | 2/1988 | Beck . | |
| 4,729,459 | 3/1988 | Inagaki et al. | 188/319 X |
| 4,826,205 | 5/1989 | Kouda et al. | 188/299 X |
| 5,035,306 | 7/1991 | Ashiba | 188/319 X |
| 5,064,032 | 11/1991 | Ashiba | 188/319 X |

FOREIGN PATENT DOCUMENTS

| 1095506 | 6/1955 | France | 188/319 |
| 59-22359 | 7/1984 | Japan . | |
| 60-37477 | 11/1985 | Japan . | |
| 159436 | 6/1990 | Japan | 188/299 |
| 379806 | 9/1973 | U.S.S.R. . | |
| 1021877 | 3/1966 | United Kingdom . | |
| 2220726 | 1/1990 | United Kingdom | 188/319 |

87/07565 12/1987 World Int. Prop. O. .

Primary Examiner—George A. Halvosa
Attorney, Agent, or Firm—Wenderoth, Lind & Ponack

[57] ABSTRACT

An adjustable damping force hydraulic shock absorber includes a cylinder, a piston slidably disposed in the cylinder, two partitioned chambers communicating with each through a plurality of passages, a damping force generating mechanism for generating a damping force by controlling a flow of hydraulic fluid through the passages, and a valve for adjusting the damping force by selectively opening and closing one of the passages. The shock absorber is set in a hard mode where a relatively large damping force is generated when the one passage is closed and is set in a soft mode where a relatively small damping force is generated when the one passage is open. The valve includes a valve body axially movable to seat on and to be raised from a valve seat formed in the one passage, a spring for biasing the valve body away from the valve seat, a plunger of magnetic material connected to the valve body at one end thereof, and a solenoid into which the plunger is inserted. The solenoid displaces the plunger against the force of the spring to seat the valve body on the valve seat when energized. The shock absorber is set in the soft mode when the solenoid is not supplied with any current, and is set in the hard mode when current is supplied to the solenoid.

7 Claims, 4 Drawing Sheets

ADJUSTABLE DAMPING FORCE HYDRAULIC SHOCK ABSORBER

BACKGROUND OF THE INVENTION

1. Field of the Invention

The present invention relates to an adjustable damping force hydraulic shock absorber for use in a vehicle such as an automobile.

2. Prior Art

Conventionally, there have been proposed adjustable damping force hydraulic shock absorbers for use in a vehicle in which the damping force can be adjusted to obtain optimum riding comfort and stable maneuverability as road conditions and running conditions change.

Such a shock absorber is disclosed, for example, in Japanese Utility Model Publication No. 59-22359 and Japanese Utility Model Publication No. 60-37477. The shock absorber disclosed comprises two partitioned chambers in a cylinder, a plurality of passages placing the two chambers in communication, a piston movable in the cylinder, a damping force generating mechanism such as an orifice for generating a damping force by controlling a flow of hydraulic fluid generated in the passages due to the sliding movement of the piston in the cylinder. The shock absorber further comprises an electromagnetic valve for selectively opening and closing one of the passages to adjust the damping force.

The electromagnetic valve includes a valve body which is normally spring-biased to close the passage but which is lifted up to open the passage when the solenoid of the valve is energized.

It is usual for the shock absorber to be set in a soft mode in which a relatively small damping force is generated when the vehicle is running under normal conditions in order to provide a comfortable ride, and to be switched to a hard mode in which a relatively large damping force is generated when the vehicle runs at a high speed or when control is effected to inhibit rolling and/or driving. On balance therefore, the time in which the shock absorber is operating in a soft mode is longer than that in which it is operating in a hard mode.

In the shock absorber mentioned above, the valve body is biased by a spring to seat on a valve seat to close the passage when the solenoid is not energized so that the shock absorber is set to the hard mode. It is, therefore, necessary to prevent the solenoid from being energized while keeping the shock absorber in the soft mode. This requires a longer period of time in which a current is supplied to the solenoid, thereby leading to increased consumption of electric power. Further, heat generated in the solenoid tends to facilitate deterioration of the hydraulic fluid.

SUMMARY OF THE INVENTION

The invention has been developed in view of the aforementioned problem, and its main object is to provide a damping force adjustable hydraulic shock absorber which is set to a hard mode when a current is supplied to an electromagnetic valve for selectively opening and closing a passage through which hydraulic fluid is to flow, thereby shortening a total period of time in which current is supplied to the valve.

To accomplish the object, the present invention provides an adjustable damping force hydraulic shock absorber comprising a cylinder containing a hydraulic fluid therein; a piston slidably disposed in the cylinder; two partitioned chambers being kept in communication with each other by means of a plurality of passages extending between the two chambers; a damping force generating mechanism for generating a damping force by controlling a flow of hydraulic fluid through the passages generated due to a sliding of the piston in the cylinder; and valve means for adjusting the damping force by selectively opening and closing one of the passages. The shock absorber is set in a hard mode where a relatively large damping force is generated when the one passage is closed and is set in a soft mode where a relatively small damping force is generated when the one passage is opened. The valve means includes a valve body axially movable to seat on and to be raised from a valve seat formed in the one passage to control fluid communication through the one passage; a biasing means for biasing the valve body away from the valve seat; a plunger connected to the valve body at one end thereof, the plunger being made of a magnetic material; and a solenoid into which the plunger is inserted. The solenoid displaces the plunger against the force of the biasing means to seat the valve body on the valve seat when energized.

In the shock absorber provided with the constitution mentioned above, when the shock absorber is set in the soft mode when the solenoid is not supplied with any current, the valve body is raised from the valve seat by means of the biasing means to open the one passage. When current is supplied to the solenoid, the plunger is displaced so that the valve body is seated on the valve seat to close the one passage, thereby setting the shock absorber in the hard mode.

DETAILED DESCRIPTION OF THE PREFERRED EMBODIMENTS

Figure 1:
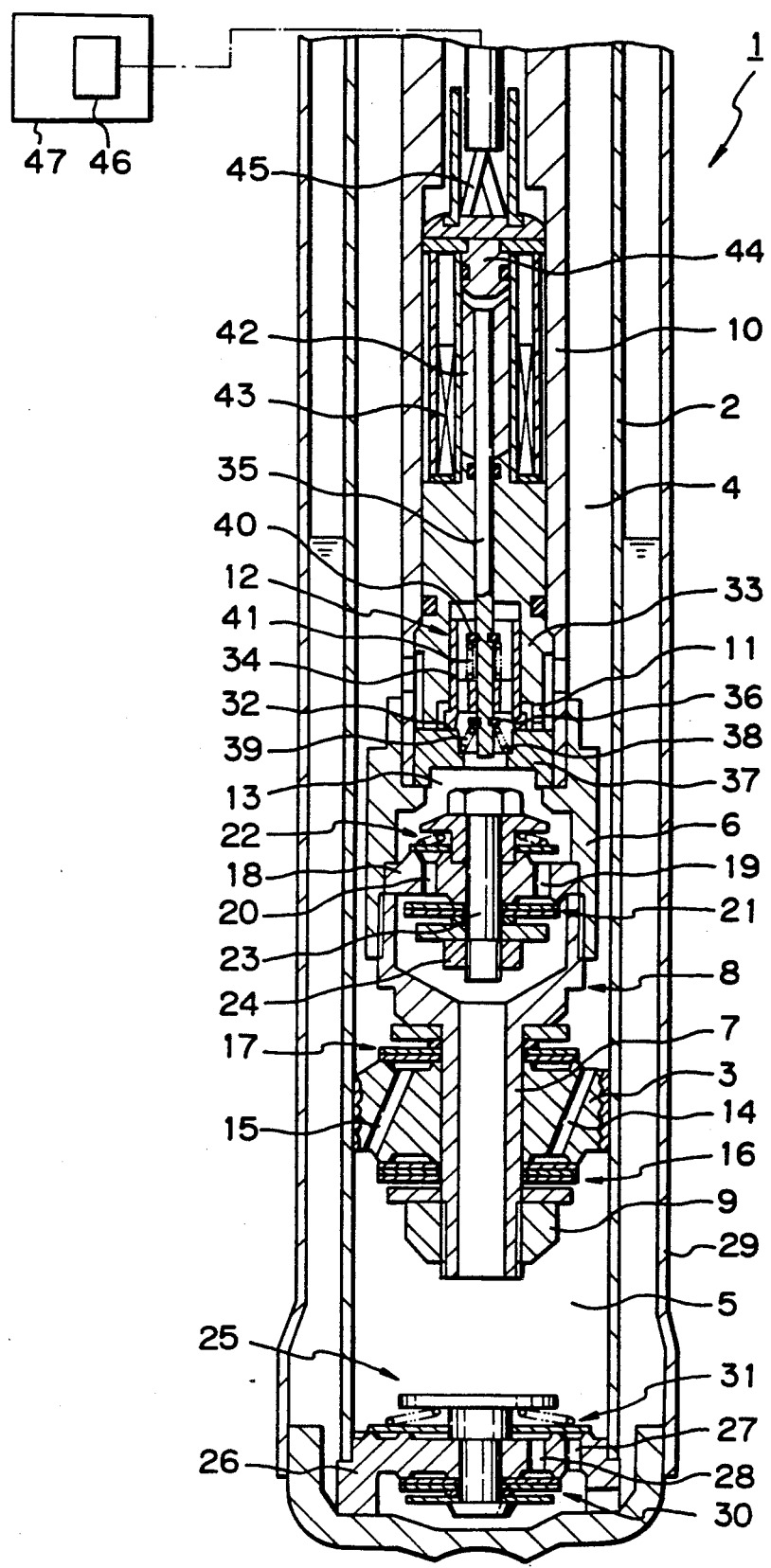
FIG. 1 is an elevational view in section of a first embodiment of an adjustable damping force hydraulic shock absorber according to the present invention.
Figure 2:
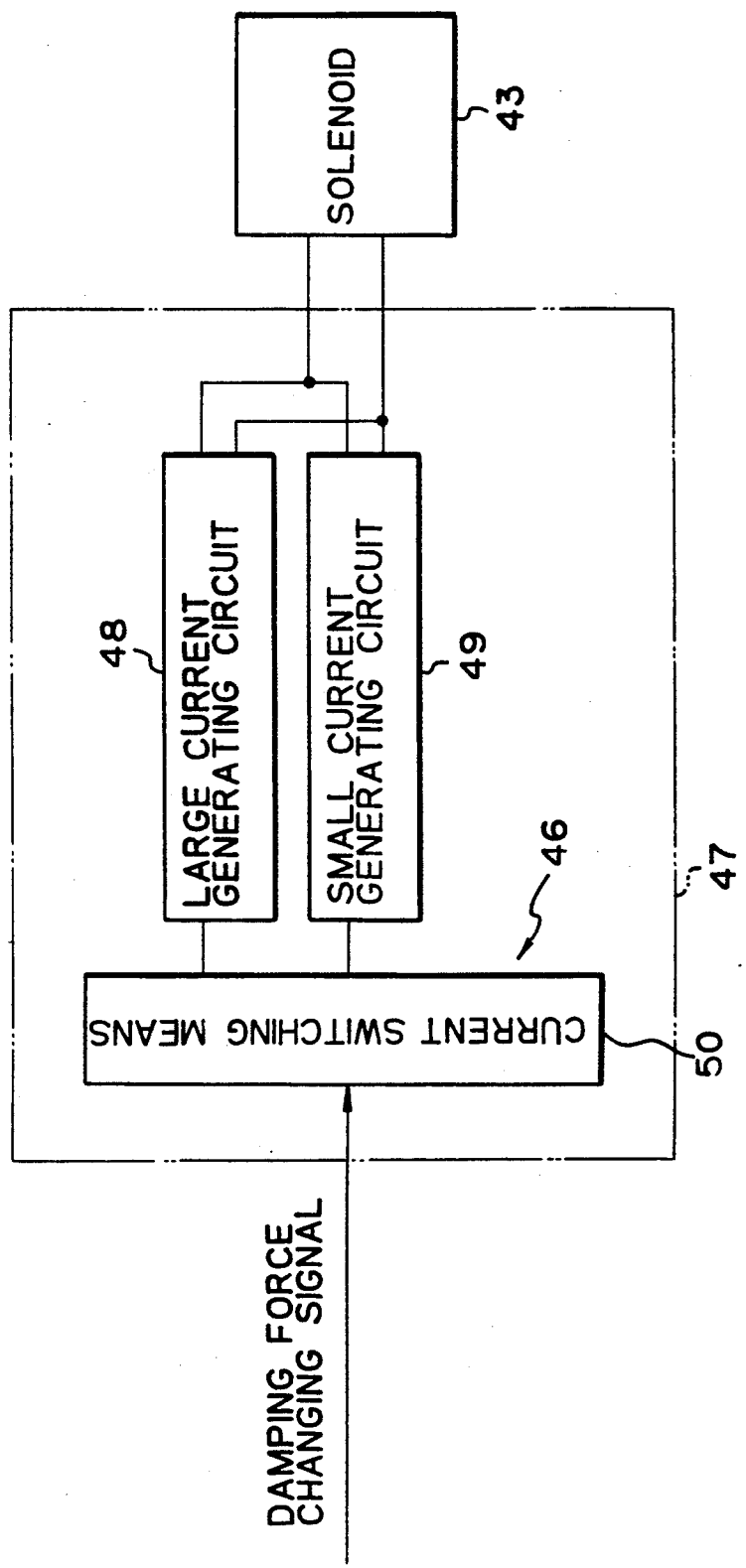
FIG. 2 is a schematic block diagram of an electric circuit for controlling the shock absorber shown in FIG. 1.

Referring to FIGS. 1 and 2, a first embodiment of the invention will be explained.

The hydraulic shock absorber 1 is a double-cylinder type wherein a piston 3 is fitted slidably in an inner cylinder 2, and the inner cylinder 2 is partitioned by the piston 3 into an upper chamber 4 on the upper side of the piston 3 in FIG. 1 and a lower chamber 5 on the lower side. The piston 3 is mounted on an outer periphery of a passage assembly 8 by means of a nut 9. The passage assembly includes a large-sized tubular member 6 and a small-sized tubular member 7 screwed to the large-sized tubular member 6. The large-sized tubular member 6 of the passage assembly 8 is screwed to one end of a piston rod 10. The other end (not shown) of the piston rod 10 projects to the outside of the cylinders. The piston rod 10 is made of a magnetic material and defines a passage 11 therein placing the interior of the passage assembly 8 in communication with the upper chamber 4. The passage is selectively opened and closed by a damping force adjusting valve 12 which will be explained hereinafter. The interior of the passage assembly 8 and the passage 11 of the piston rod 10 constitute together a bypass passage 13 for keeping the upper chamber 4 and the lower chamber 5 in communication with each other.

A first extension side passage 14 and a first retraction side passage 15 are formed through the piston 3 for placing the upper and lower chambers 4, 5, respectively, in communication with each other. A first extension side damping force generating mechanism 16 and a first retraction side damping force generating mechanism 17 are mounted on the lower chamber 5 side and the upper chamber 4 side of the piston 3, respectively, and in association with the first extension side passage 14 and the first retraction side passage 15, respectively. The first extension side damping force generating mechanism 16 includes a disc valve and an orifice (not shown) and generates a damping force by controlling a flow of hydraulic fluid generated during the extension stroke of the shock absorber 1. The first retraction side damping force generating mechanism 17 includes a disc valve and generates a damping force by controlling a flow of fluid generated during the retraction stroke of the shock absorber 1.

A partition member 18 is fitted in the passage assembly 8 to partition the interior of the large-sized tubular member 8 from the interior of the small-sized tubular member 7, thereby shutting off the bypass passage 13. The partition member 18 defines second extension and retraction side passages 19 and 20, respectively, placing the interiors of the large-sized and small-sized tubular members 6 and 7, respectively, in communication with each other. A second extension side damping force generating mechanism 21 is located in the small-sized tubular member 7 and is mounted on the partition member 18. The second extension side damping force generating mechanism 21 includes a disc valve and an orifice (not shown) and is associated with the second extension side passage 19 to generate a damping force by controlling a flow of hydraulic fluid generated during the extension stroke of the shock absorber 1. A check valve 22 is located in the large-sized tubular member 6 and is mounted on the partition member 18. The check valve is associated with the second retraction side passage 20 so as to permit a flow of fluid flowing from the interior of the small-sized tubular member 7 to the interior of the large-sized tubular member 6 and to prevent a flow of hydraulic fluid flowing in the reverse direction. The disc valve of the second extension side damping force generating mechanism 21 is designed so as to open at a pressure which is lower than the pressure at which the disc valve of the first extension side damping force generating mechanism 16 opens. The second extension side damping force generating mechanism 21 and the check valve 22 are fastened onto the partition member 18 by means of a bolt 23 and a nut 24.

A body part mechanism 25 is provided on the bottom portion (lower side in FIG. 1) of the inner cylinder 2 for generating a damping force during the retraction stroke of the shock absorber 1. The body part mechanism 25 includes a partition member 26 for keeping the interior of the inner tube 2 from communicating with an annular space defined between the inner and outer cylinders 2 and 29, respectively, third extension and retraction side passages 27 and 28, respectively, formed through the partition member 26, a third retraction side damping force generating mechanism 30 located in the inner cylinder 2 and mounted on the partition member 26, and a check valve 31 mounted on the side of the partition member 26 remote from the mechanism 30. The third retraction side damping force generating mechanism includes a disc valve and an orifice (not shown) and is associated with the third retraction side passage 28 to generate a damping force by controlling a flow of hydraulic fluid in the contraction stroke of the shock absorber 1. The check valve 31 is associated with the third retraction side passage 28 to allow a flow of fluid flowing from the space defined between the inner and outer cylinders 2 and 29, respectively, into the inner cylinder 2 and to prevent a reverse flow of fluid.

Next, the damping force adjusting valve 12 which constitutes a main portion of the present invention will be described in detail.

An annular valve seat member 37 is disposed midway of the passage 11 formed in the piston rod 10. The valve seat member 37 is provided with a valve seat 32 formed thereon. A supporting member 33 made of a magnetic material is fitted in the piston rod 10 and axially slidably receives therein a generally tubular valve member 34. The valve member is adapted to separate from and seat on the valve seat 32 to open and close the bypass passage 13. A shaft 35 made of a non-magnetic material is slidably inserted through the valve member 34. The shaft 35 is provided with a stop ring 36 mounted on the lower end thereof, so that the valve member will be lifted upward when the shaft 35 is moved upwardly. The valve seat member 37 is formed with a stepped portion 38 formed on the inner surface thereof. A coil spring 39 is disposed between the stepped portion 38 and the stop ring 36 to constantly bias the shaft 35 upwardly. Another or second stop ring 40 is located opposite to the first mentioned stop ring 36 with respect to the valve member 34 and is mounted on the shaft 35. A second biasing spring 41 is disposed between the second stop ring 40 and the valve member 34 to constantly bias the valve member downwardly. The second biasing spring 41 is designed so as to constantly bias the valve member 34 downwardly with substantially the same biasing force in order to reliably move the valve member 34 downwardly when the shaft is moved downwardly.

The shaft 35 extends through the supporting member 33 axially upwardly of the piston rod 10. On the upper end of the shaft 35 is mounted a plunger 42 made of a magnetic material. The plunger 42 is inserted into a solenoid 43. A base member 44 is located above the solenoid 42, so that the axial movement of the plunger 42 is restricted between the supporting member 33 and the base member 44. Lead wires 45 from the solenoid 43 extend in the piston rod 10 and are connected to an electric circuit 46 outside the shock absorber 1.

The electric circuit 46 is incorporated in a control unit 47 and includes a large current generating circuit 48 and a small current generating circuit 49. A current switching means 50 is further provided for selectively supplying a large current and a faint current to the solenoid 43 by a switching of the two circuits 48 and 49. Current to be supplied to the solenoid is controlled such that a large current is supplied to the solenoid 43 at the initial stage of power supply to move the plunger 42 downwardly (as viewed in FIG. 1) against the force of the spring 39 and, after the plunger 42 has reached the supporting member, a faint current is supplied.

Various means can be employed for determining when the plunger 42 has reached the supporting member 33. In the present embodiment, such means is a timer means for counting to a predetermined period of time. The period of time is determined by calculating or estimating the period of time necessary for the plunger 42 to reach the supporting member 33 after the supply of power to the solenoid 43 has begun. When the timer has counted to the predetermined period of time, the determining means makes a judgement that the plunger 42 has reached the supporting member 33. In an alternative embodiment, the determining means may judge that the plunger 42 has reached the supporting member 33 when the current flowing through the solenoid 43 has become even, since the current flowing through the solenoid 43 changes as the plunger 42 is displaced. In a further alternative embodiment, a sensor may be provided for detecting the contact of the plunger 42 with the supporting member 33. The means for determining when the plunger 42 has reached the supporting member 33 may be included in the current switching means 50.

Operation of the shock absorber having the above-mentioned constitution will now be explained.

When no current is supplied to the solenoid 43, the shaft 35 is positioned upward by means of the coil spring 39, and the valve member 34 is lifted up by the shaft 35 through the stop ring 36 so that the bypass passage 13 is kept open. During the extension stroke of the shock absorber 1, a relatively small damping force is generated by the second extension side damping force generating mechanism 21 associated with the second extension side passage 19 formed through the partition member 18 fitted in the passage assembly 8, while, during the retraction stroke of the shock absorber, a relatively small damping force is generated by means of the third contraction side damping force generating mechanism 30 associated with the third retraction side passage 28 formed through the partition member 26 of the body part mechanism 25 (soft mode).

When a damping force changing signal is supplied to the current switching means 50 from a manual switch (not shown) or sensors (not shown) arranged to detect various running conditions such as steering angle, braking force, running speed and so on, current is supplied to the solenoid 43 to close the bypass passage 13. At the initial stage of power supply, the large current generating circuit 48 is activated to supply a large current to the solenoid in order to displace the valve member 34 with a large force sufficient to overcome the biasing force applied on the valve member 34 through the shaft 35 and the stop ring 36. When the plunger 42 is displaced downwardly, the valve member 34 is also displaced downwardly by the plunger 42 through the shaft 35 and the spring 41 to seat on the valve seat 32, thereby closing the bypass passage 13 as shown in FIG. 1. In this condition, the stop ring 36 is separated away from the valve member 34. When the plunger 42 has reached the supporting member 33, the current switching means activates the small current generating circuit 49 while deactivating the large current generating circuit 48. Since the plunger 42 is attracted by the supporting member 33 once the plunger 42 engages the supporting member 33, a very small current is sufficient to keep the plunger 42 in the lowered position.

In this condition where the bypass passage 13 is closed, a relatively large damping force is generated by the first extension side damping force generating mechanism 16 associated with the first extension side passage 14 formed through the piston 3 during the extension stroke of the shock absorber 1; while during the retraction stroke of the shock absorber 1, a relatively large damping force is generated by the first retraction side damping force generating mechanism 17 associated with the first retraction side passage 15 formed through the piston 3 and the third retraction side damping force generating mechanism 30 associated with the third retraction side passage 28 formed through the body member 26 (hard mode).

Figure 3:
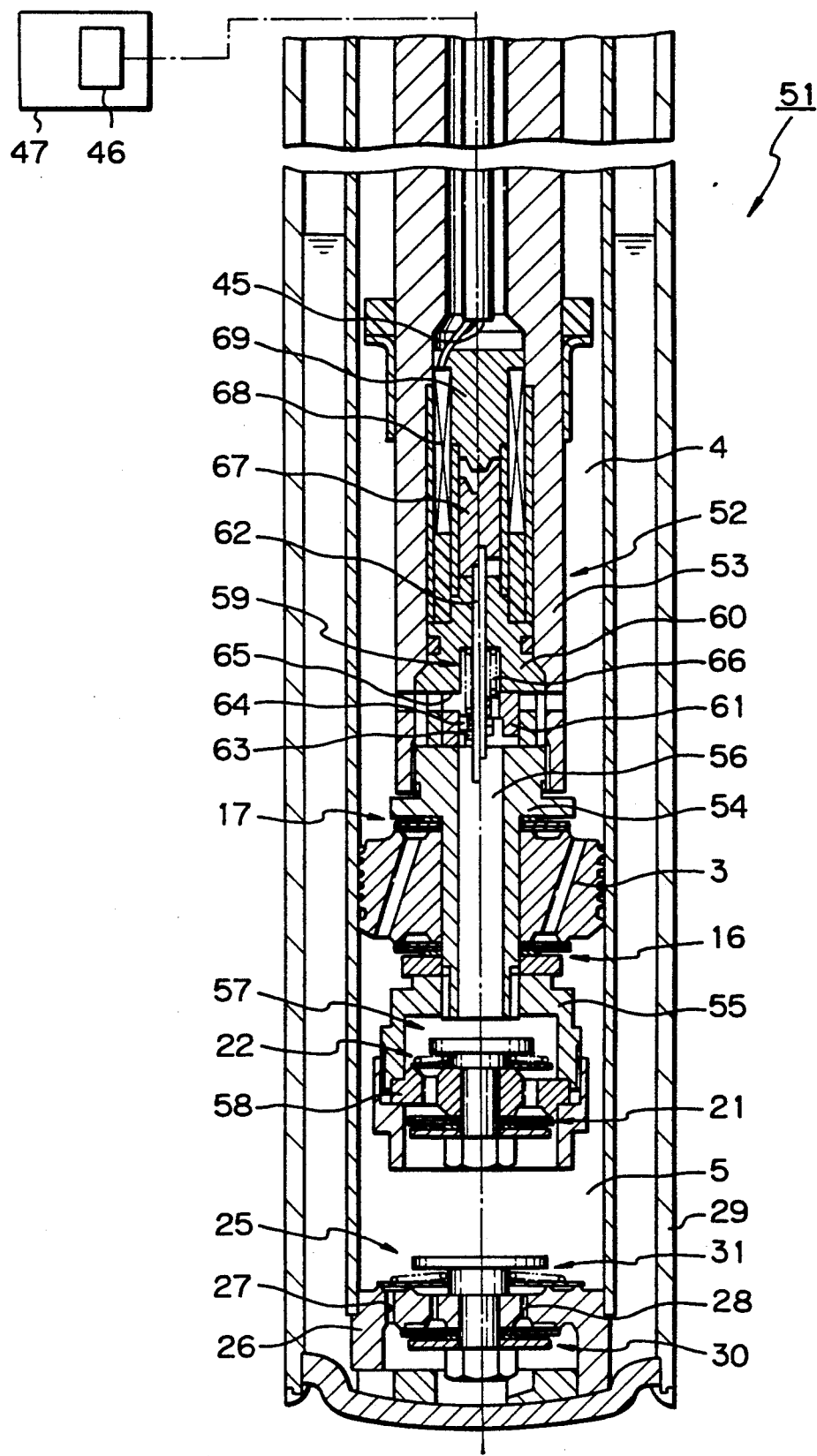
FIGS. 3 and 4 are views similar to FIG. 1 but of second and third embodiments, respectively.

Referring to FIG. 3, an adjustable damping force hydraulic shock absorber 51 according to a second embodiment will be explained. The same reference numerals will be given to the same elements as those of the first embodiment and detailed explanation thereof will be omitted.

A piston rod 52 includes a main member 53 one end of which extends to the outside of the absorber 51 and a smaller diameter member 54 fitted on the other end of the main member 52. A piston 3 is fixedly fitted on the outer circumference of the smaller diameter member 54. A tubular member 55 is mounted on the tip of the smaller diameter member 55. A bypass passage 57 is defined by a passage 56 formed in the piston rod 52 and the interior of the tubular member 55. The bypass passage 57 communicates between upper and lower cylinder chambers 4 and 5, respectively. In the same manner as in the case of the first embodiment, first damping force generating mechanisms 16 and 17 are mounted on the piston 3. A partition member 58 is fitted in the tubular member 55 for interrupting the flow of fluid through the bypass passage 57. In the same manner as in the case of the first embodiment, a second extension side damping force generating mechanism 21 and a check valve 22 are mounted on the partition member 58.

A damping force adjusting valve 59 selectively opens and closes the bypass passage 57.

A supporting member 60 is fitted in the piston rod 52 and a tubular valve member 61 is, in turn, axially slidably fitted in the supporting member 60. A shaft 62 slidably extends through the valve member 61 and is provided with a nut screwed to the lower end thereof. When the shaft 62 is moved upwardly, the valve member 61 is lifted up by the nut 63. The valve member 61 is provided with a plurality of holes formed therethrough for placing the passage 56 in communication with the upper cylinder chamber 4 when the valve member 61 is in a lowered position. The supporting member 60 is provided with a valve seat 65 on which the valve member is adapted to seat when lifted to interrupt the flow through the bypass passage 57. Shown at 66 is a coil spring disposed between the valve member 61 and the supporting member to constantly bias the valve member 61 away from the valve seat 65.

The shaft 62 extends through the supporting member 60 axially upwardly and is provided with a plunger 67 mounted on the upper end thereof. The plunger is made of a magnetic material and inserted into a solenoid 68. A base member 69 made of a magnetic material is disposed above the solenoid 68, so that the axial movement of the plunger 69 is restricted between the supporting member 60 and the base member 69. Lead wires 45 from the solenoid 68 extend in the piston rod 52 to the outside of the shock absorber 51 where they are connected to an electric circuit 46. When the solenoid 68 is energized, the plunger 67 is displaced upwardly. The electric circuit 46 is the same as the one used in the first embodiment shown in FIG. 2.

The operation of a shock absorber provided with the constitution mentioned above will be described.

When the solenoid is not energized, the valve member 61 is lifted up from the valve seat 65 by means of the spring 66 so that the bypass passage 57 is kept open as shown in the left half of FIG. 3. Thus, a damping force in a soft mode is generated in the same manner as in the first embodiment.

When current is supplied to the solenoid from the electric circuit, the plunger 67 is moved upwardly as viewed in FIG. 3 so that valve member 61 seats on the valve seat 65 to interrupt the flow through the bypass passage 57. Although a large current is supplied to the solenoid 68 from the large current generating circuit 48 of the electric circuit 46 at the initial stage of power supply, the current switching means switches from the large current generating circuit 48 to the faint current generating circuit 49.

In the condition where the bypass passage 57 is interrupted as shown in the right half of FIG. 3, a damping force in a hard mode is generated in a manner similar to the one in the first embodiment.

Figure 4:
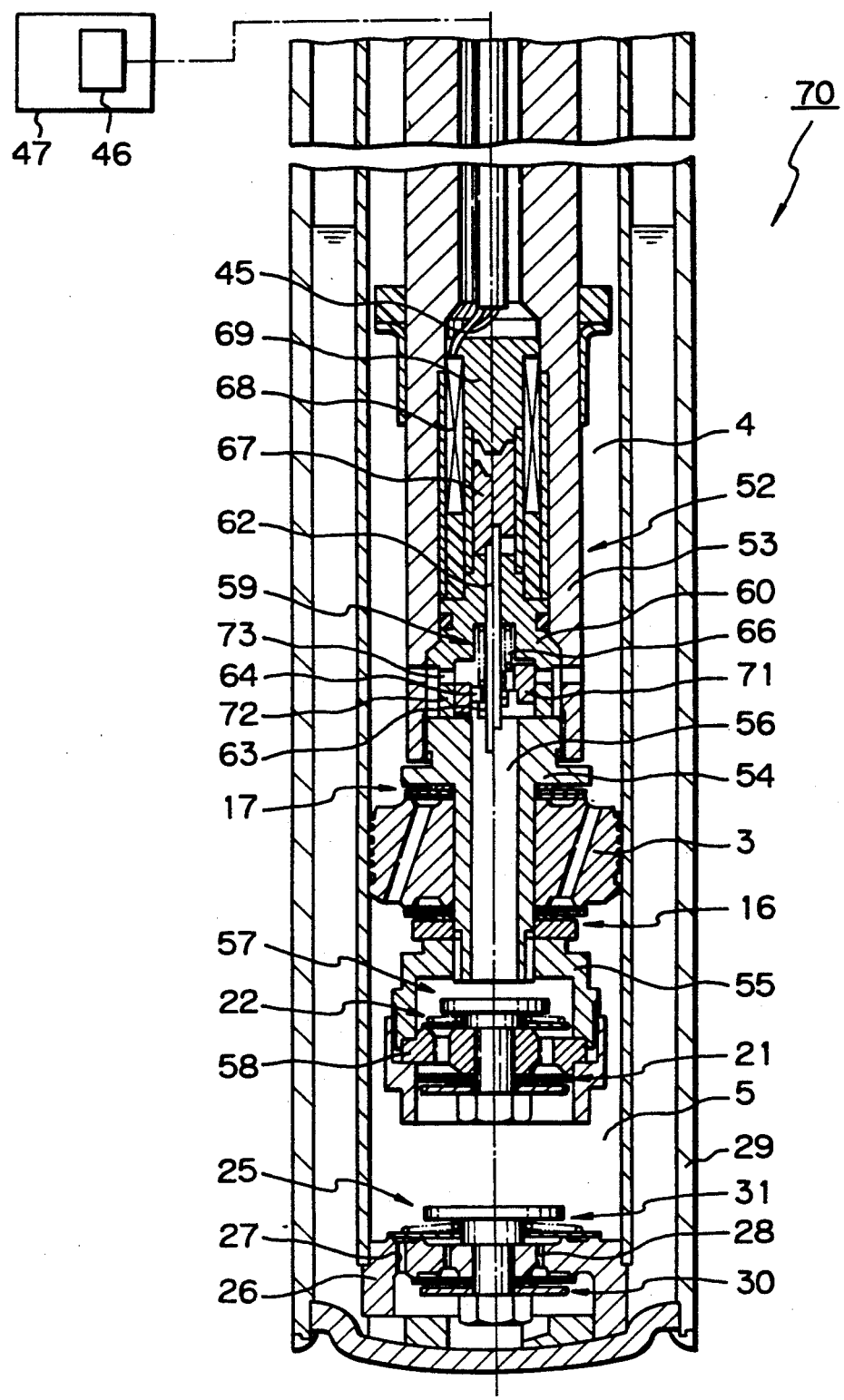

FIG. 4 shows a hydraulic shock absorber 70 according to a third embodiment of the invention which could be regarded as a variant of the second embodiment shown in FIG. 3.

In the second embodiment shown in FIG. 3, when the shock absorber 51 retracts while the valve member 61 is seated on the valve seat 65, the pressure generated in the lower chamber 5, which is higher than that in the upper chamber 4, acts on the lower end surface of the valve member 61. In order to enable the valve member 61 to be reliably raised from the valve seat 65 when the shock absorber 51 is changed from a hard mode to a soft mode while the valve member 61 is seated on the valve seat 65 and receiving the hydraulic pressure on the lower end surface thereof, the spring coil 66 may have to be designed to provide a relatively large biasing force. Further, when the shock absorber 51 extend while the valve member 61 is seated on the smaller diameter member 54, the pressure generated in the upper chamber 4, which is higher than that in the lower chamber 5, acts on the upper end surface of the valve member 61. In order to enable the valve member 61 to be reliably seated on the valve seat 65 when the shock absorber 51 is changed from a soft mode to a hard mode while the valve member 61 is seated on the smaller diameter member 54 and receiving the hydraulic pressure on the upper end surface thereof, the solenoid 68 may have to be designed to provide a relatively large attracting force.

The shock absorber 70 is provided with a sleeve 72 formed integrally with the supporting member 60. The sleeve 72 is provided with radially extending through-holes 73 which constitute a portion of the bypass passage 13. When the shock absorber 70 is in a soft mode, as shown in the left half of FIG. 4, a valve member 71 is displaced away from a valve seat on the inner surface of the sleeve 72 around the through holes 73 to open the bypass passage 13. In this condition, the valve member 71 separates from the smaller diameter member 54 to define a clearance therebetween while the plunger 67 abuts against the supporting member 60. Thus, the valve member 54 receives the same hydraulic pressure on the upper and lower end surfaces thereof. When the shock absorber 70 is in a hard mode, as shown in the right half of FIG. 4, the valve member 71 is raised to seat on the valve seat over the through holes 73 to interrupt the flow through the bypass passage. In this condition, the valve member 71 separates from the supporting member 60 to define a clearance therebetween while the plunger 67 abuts against the base member 69. Thus, the valve member 71 receives the same hydraulic pressure on the upper and lower end surfaces thereof. Since the valve member 71 constantly receives the same hydraulic pressure on the upper and lower end surfaces thereof, a small biasing force of the spring 66 and a small attracting force of the solenoid 68 are sufficient to ensure reliable movement of the valve member 71 when the shock absorber is changed between the two modes.

In the above-mentioned embodiments, the damping force adjusting valve of the present invention is employed to open and close the bypass passage 13, 57 formed through the piston 3. It should be noted, however, that the damping force adjusting valve of the invention may be employed for a hydraulic shock absorber of the type, for example, disclosed in Japanese Utility Model Publication No. 59-22359 in which a passage formed in the body part mechanism is adapted to be selectively opened and closed.

As explained above, an adjustable damping force hydraulic shock absorber is adapted to be set to a soft mode where the bypass passage between the upper and lower cylinder chambers is kept open when the solenoid is not energized and to a hard mode where the bypass passage is closed when the solenoid is energized. The total period of time when the solenoid is energized is, therefore, shortened as compared to the conventional shock absorbers, thereby reducing the consumption of electric power. This is very advantageous for lengthening the life of the battery as well as for preventing faster deterioration of the hydraulic fluid as a result of heat generated in the solenoid. It should further be noted that a faint current is sufficient to keep the shock absorber in the hard mode. This is also advantageous for reducing the consumption of electric power.

While the preferred embodiments have been described above, it is to be understood that modifications will be apparent to those skilled in the art without departing from the spirit of the invention. The scope of the invention, therefore, is to be determined solely by the following claims.

What is claimed is:

1. An adjustable damping force hydraulic shock absorber comprising:

a cylinder containing hydraulic fluid therein;

a piston slidably disposed in the cylinder;

two partitioned chambers communicating with each other via a plurality of passages, one of the passages defining a valve seat therein;

damping force generating mechanism means for generating a damping force by controlling a flow of hydraulic fluid through the passages generated by a sliding of the piston in the cylinder; and valve means for adjusting the damping force by selectively opening and closing said one of the passages, said shock absorber being in a hard mode in which a relatively large damping force is generated when said one of the passages is closed and being in a soft mode in which a relatively small damping force is generated when said one of the passages is open, said valve means including a valve member axially movable in the cylinder between a position at which the valve member is seated on said valve seat to thereby close said one passage of the passages and a position at which the valve member is raised off of said valve seat to thereby open said one of the passages, a plunger having a shaft extending through said valve member and slidable relative thereto, said plunger being made of a magnetic material, a retainer internal with said shaft and adapted to engage said valve member to lift the valve member from said valve seat, first biasing means for biasing said valve member away from said valve seat, second biasing means for biasing said valve member towards said valve seat, a supporting member disposed below said plunger, said supporting member being made of a magnetic material, said shaft of the plunger extending through said supporting member, and a solenoid into which said plunger extends and is slidable relative thereto, said plunger being displaced into contact with said supporting member against the force of said first biasing means and said retainer being separated from said valve member when said solenoid is energized so as to permit said second biasing means to seat said valve member on the valve seat.

2. An adjustable damping force hydraulic shock absorber according to claim 1, wherein said first biasing means biases said plunger so that the valve member is biased away from said valve seat through the engagement of the valve member with the retainer.

3. An adjustable damping force hydraulic shock absorber according to claim 2, wherein said valve means further comprises a second retainer mounted on the shaft and located opposite to the first-mentioned retainer with respect to the valve member, and said second biasing means is disposed between the valve member and the second retainer.

4. An adjustable damping force hydraulic shock absorber according to claim 3, and further comprising second damping force generating mechanism means disposed in said one of the passages for generating a damping force at least during the extension of the shock absorber.

5. An adjustable damping force hydraulic shock absorber according to claim 3, and further comprising an electric circuit including a large current supplying circuit controllable to supply a large current to the solenoid during a commencement of power supply to the solenoid and a small current supplying circuit controllable to a small current to the solenoid following the commencement of power supply.

6. An adjustable damping force hydraulic shock absorber according to claim 2, and further comprising second damping force generating mechanism means disposed in said one of the passages for generating a damping force at least during the extension of the shock absorber.

7. An adjustable damping force hydraulic shock absorber according to claim 2, and further comprising an electric circuit including a large current supplying circuit controllable to supply a large current to the solenoid at a commencement of power supply to the solenoid and a small current supplying circuit controllable to supply a small current to the solenoid following the commencement of power supply.

* * * * *